July 25, 1950     R. S. NEVIN, SR., ET AL     2,516,335
VARIABLE FORCE VIBRATOR
Filed March 25, 1947     3 Sheets-Sheet 1
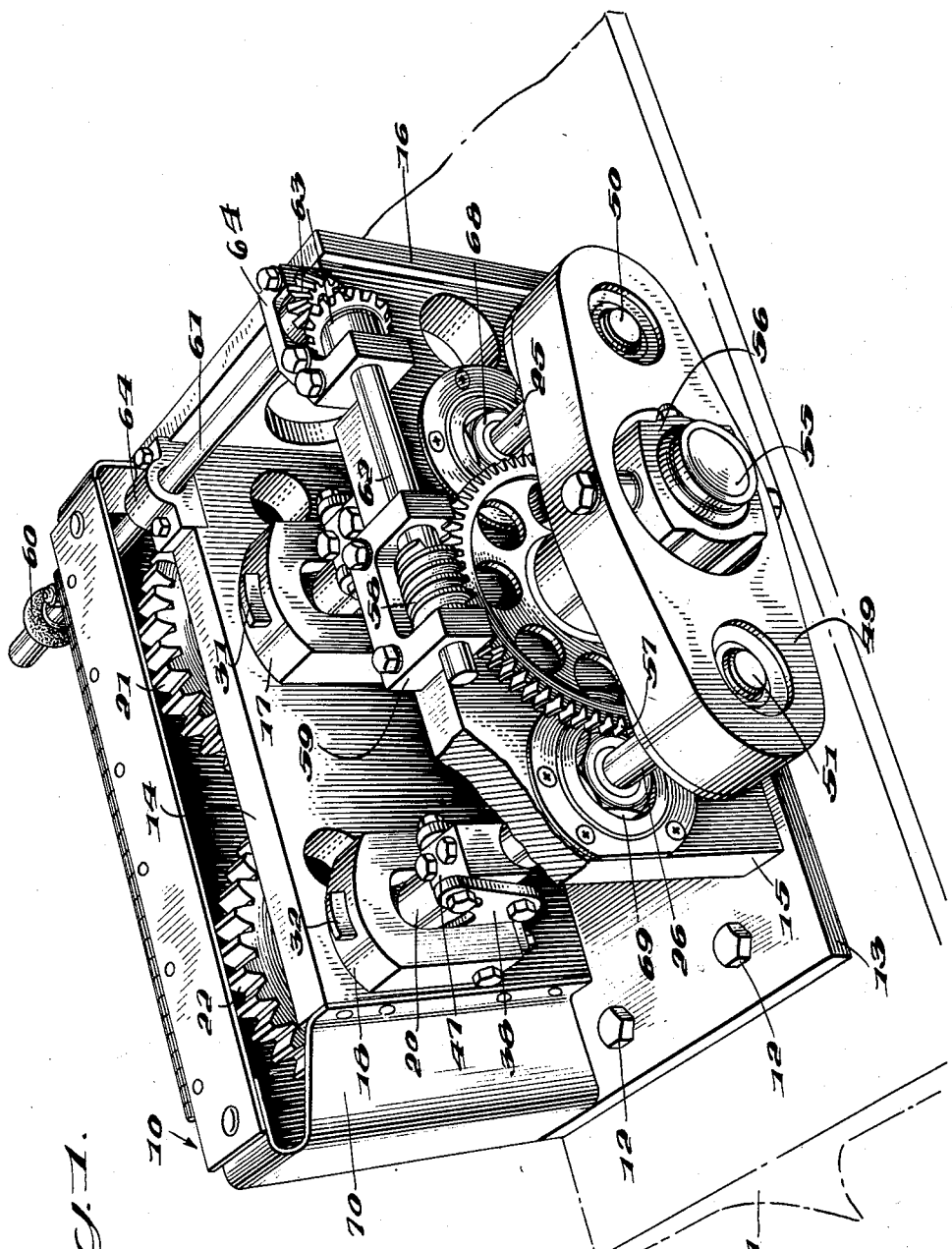
Inventors
ROBERT S. NEVIN SR.
CARLETON M. FIELDS
By Donald W. Farrington
Attorney

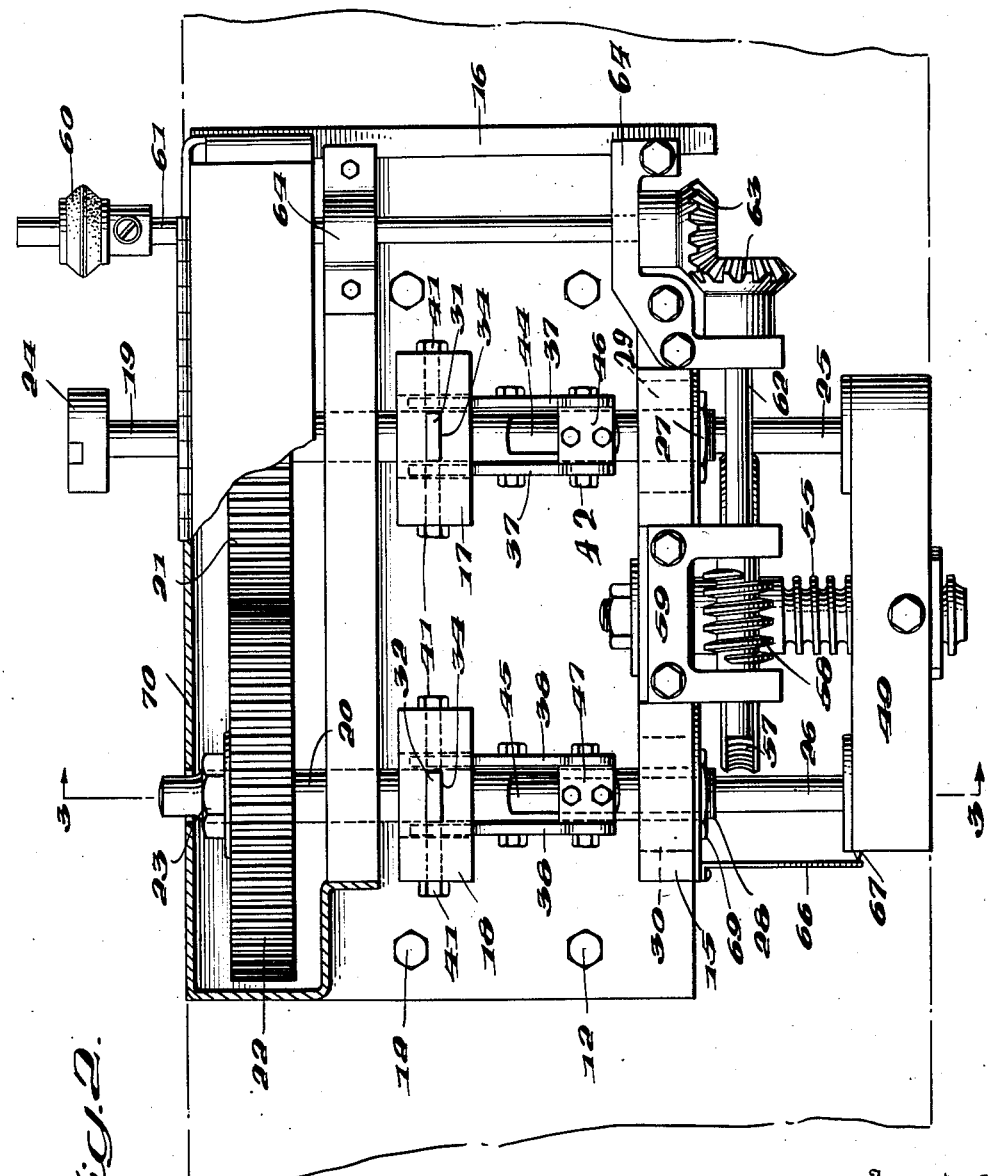

July 25, 1950
R. S. NEVIN, SR., ET AL
2,516,335
VARIABLE FORCE VIBRATOR
Filed March 25, 1947
3 Sheets-Sheet 3
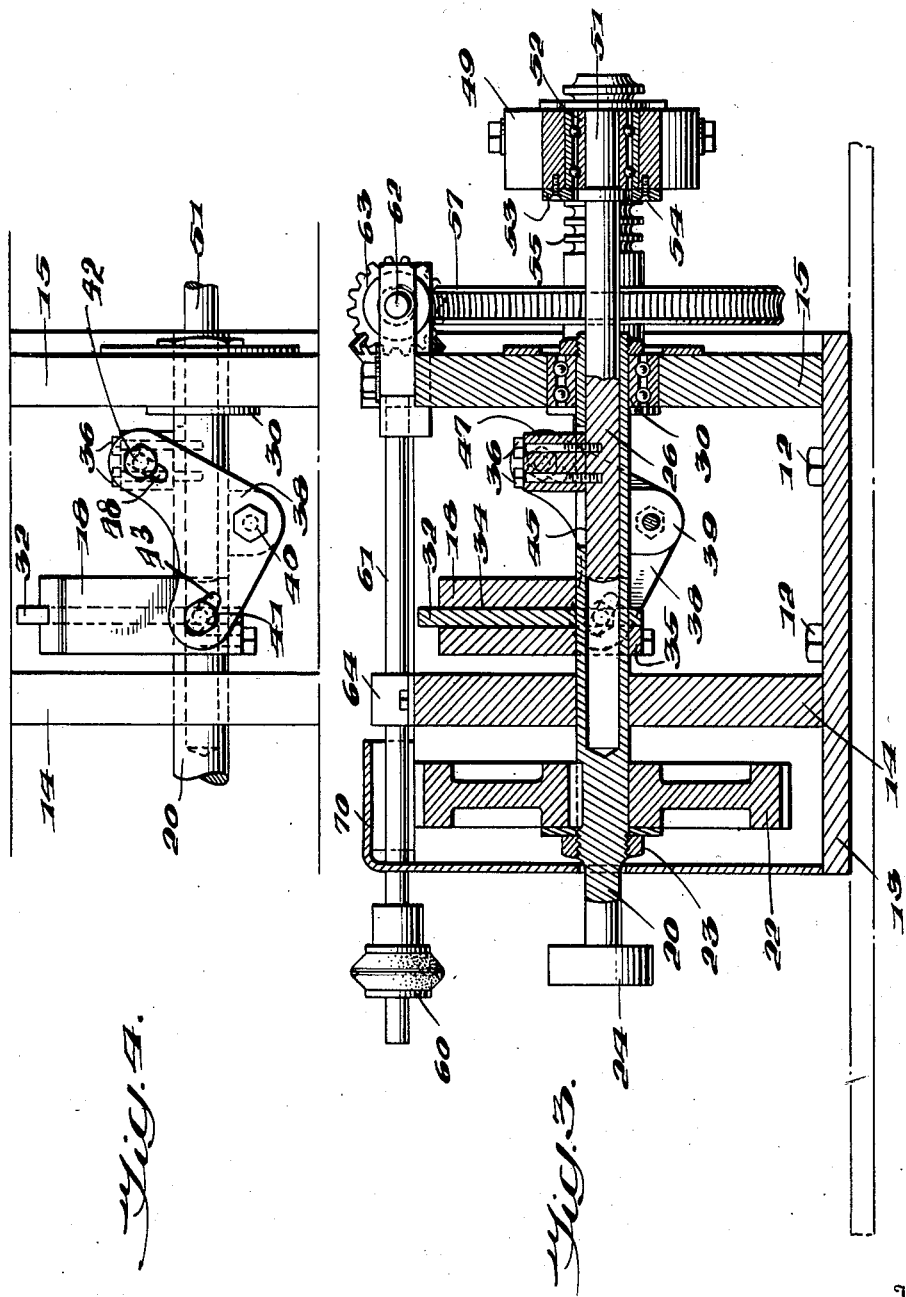
Inventors
ROBERT S. NEVIN SR.
CARLETON M. FIELDS
By Donald W. Farrington
Attorney Patented July 25, 1950

2,516,335

UNITED STATES PATENT OFFICE 2,516,335

VARIABLE FORCE VIBRATOR

Robert S. Nevin, Sr., and Carleton M. Fields, Baltimore, Md., assignors to The Glenn L. Martin Company, Middle River, Md., a corporation of Maryland Application March 25, 1947, Serial No. 737,172

8 Claims. (Cl. 74—61)

Our invention relates generally to a variable force vibrator and more particularly a mechanism capable of developing variable forces at variable frequencies or variable forces at constant frequencies while being continuously operated.

In the testing of aircraft, railway units, automobiles and similar heavy equipment, it is highly desirable to produce vibrations of relatively great force over wide ranges of frequencies so as to simulate the vibratory forces that may result under extreme operating conditions to which such equipment may be subjected. Attainment of such simulated conditions has heretofore been considered impossible due to the wide ranges of force at different frequencies required. The present invention provides a vibration device comprising a pair of spaced parallel shafts geared to each other for synchronous rotation, said geared connection including means to effect relative angular adjustment of the shafts with respect to each other to determine the direction of the vibratory test load, weights pivotally mounted on said shafts to provide varying weight eccentricity, and rods movable axially of the shafts operatively connected to the weights and to each other to provide control of the eccentricity and thus control the magnitude of the vibratory test load.

It is among the objects of our invention to provide a means of developing controlled variable oscillating forces having a range of frequencies extending from 0 to as high as 8,000 cycles per minute, by means of controlling the eccentricity of bodies rotated about given center lines.

A further object of our invention is to provide a machine wherein the forces produced therein by the rotation of eccentric weights may be positively controlled by external adjustment during the time of operation.

Another object is to provide a simple inexpensive vibrator capable of being attached to heavy equipment in which the ratio of force developed relative to the weight of the device is sufficient to avoid damping out the vibrations transmitted to the equipment under test.

A still further object is to provide a mechanism capable of developing controlled variable forces in any given direction at either variable or constant frequencies.

Other objects of this invention will become apparent from the following description when taken in conjunction with the accompanying drawings in which like numbers refer to like parts in the different views.

In the drawings:

Figure 1 is a perspective view of the vibrator of our invention shown attached to a beam to be vibrated.

Figure 2 is a plan view of the vibrator with cut-away sections to show certain details.

Figure 3 is a cross-sectional view of the vibrator on the line 3—3 of Figure 2.

Figure 4 is a partial side view of the vibrator showing details of the weight controls and their mountings.

Referring in detail to the drawings, the vibrator of our invention is formed as a compact unit 10 adapted for attachment to an object to be vibrated, such as the beam 11 fragmentarily shown in Figure 1, by bolts 12, or similar securing means. All of the working parts of the vibrator unit 10 are mounted directly or indirectly on a rigid substantially rectangular shaped base plate 13. The rotating parts and their controls are raised above the base plate 13 and supported by suitably spaced uprights designated as wall 14 and control mount 15 either formed as integral parts or rigidly secured to the base. These two uprights are conveniently joined at one end of the unit by a wall 16 which adds rigidity to the unit. The directed vibration produced by the vibrator is attained by the driven rotation of two matched weights 17 and 18 rotatably carried by a drive shaft 19 (Figure 2) and driven shaft 20, respectively, carried by the uprights transversely of the base plate. The two parallel shafts are provided for rotative engagement with each other by a drive gear 21 mounted at one end of drive shaft 19 meshed with a second, or driven, gear 22 affixed to the adjacent end of driven shaft 20 and secured in place by means of a nut 23 or similar securing means. Means for driving shaft 19 is provided by a coupling 24 placed outwardly of gear 21 arranged for drive attachment with a suitable power unit of conventional design capable of delivering sufficient rotative force at determinable speeds to operate the unit. Both the drive shaft 19 and driven shaft 20 are formed tubular for a substantial portion of their lengths as best shown in Figure 3. The purpose of the tubular formation is to provide for introduction of matched control rods 25 and 26 suitably formed for insertion interiorly of said shafts 19 and 20 through their open ends 27 and 28 arranged to protrude slightly beyond suitable end bearings 29 and 30 carried by control wall 15. Ends 27 and 28 of shafts 19 and 20 are also formed with suitably threaded abutment portions formed to receive securing nut and washer assembles 68 and 69, or like means, arranged to secure the shafts against undesired axial movement (Figure 1).

Weights 17 and 18 of predetermined size and weight are formed as open ended U's suitable for straddled mounting on shafts 19 and 20, respectively. The weights 17 and 18 are not attached directly to the shaft but are arranged for restricted radial movement relative to each respective shaft from positions of concentricity to varying degrees of eccentricity, as required to produce different forces of vibration as they are rotated. The weights 17 and 18 are driven and held to radial movement by guide bars 21 and 32 attached to the exterior surface of the shafts 19 and 20 by welding or similar means with ends extended at right angles to the shafts. The size and arrangement of each guide bar is such as to provide for inserted positioning through slots 34 formed in the weights, extending from the interior of each weight to the top thereof with the ends of the guide bars protruding above the weights as best shown in Figure 1. A safety bar arranged to limit the maximum degree of eccentricity attainable by each weight is provided by end strap 35 (Figure 3) bolted across the U legs of each weight.

Exterior control of the degree of eccentricity of the weights is accomplished by axial manipulation of control rods 25 and 26 arranged to extend within the hollow portion of shafts 19 and 20 and connect with the weights as best illustrated in Figure 3. The weights are movably connected to the control rods by means of pairs of pivoted arms 37 and 38 pivotably carried by the shafts 19 and 20. These arms are arranged for pivoted attachment to each respective shaft by bolts 40 inserted through pivot points 39 affixed to each shaft. The pairs of arms 37 and 38 are in turn arranged for engagement with the interior of the U legs of the weights by threaded pins 41 (Figure 4) inserted through slotted holes 43 in the weight ends of arms 37 and 38. A portion of the walls of the drive shaft 19 and driven shaft 20 are cut away to form slots 44 and 45 to allow for access to the control rods so as to provide for connection between the control rods and the control ends of arms 37 and 38. Points of connection between the rods and arms consist of blocks 46 and 47 dimensioned and positioned for attachment to the control rods so as to extend through the slots 44 and 45 of the shafts. The dimensions of blocks 46 and 47 relative to slots 44 and 45 allow for axial movement of the blocks within the slots sufficiently to allow for movement of the weights 17 and 18 from points concentric to the shafts to points of extreme eccentricity to said shafts. It is, of course, obvious that as a matter of assembly it is advantageous to mount the blocks 46 and 47 on the control rods by removable means such as cap screws 36 as shown. Furthermore, the amount of leverage required by the force developed in the weights for a given eccentricity will determine length of the arms and height of the blocks. Rotative attachment between the control side of arms 37 and 38 and blocks 46 and 47 is provided by bolts 42 inserted through slotted holes 48 in the blocks. It will be noted that slotted holes are provided at the arm end attachment points in order to allow for differences of angular displacement between these members resulting from the fixed nature of the shafts and pivot points.

The amount of axial movement of the control rods 25 and 26 within shafts 19 and 20 is exteriorly determined by means of a yoke 49 extending between the two rods with their ends 50 and 51 provided with thrust resistant bearing assemblies 52 carried by said yoke (Figure 3). The thrust bearings are held in place by suitable plates 53 attached to the yoke by screws 54, or like means. Axial movement of the yoke relative to the shafts is provided for by a threaded spur shaft 55 rotatably carried by the control wall 15 and arranged for threaded engagement with the yoke by a swiveled unit 56 carried by the yoke. Rotation of the spurred shaft 55 is attained by means of a large worm gear 57 affixed thereto and arranged for meshed engagement with a drive work gear 58 carried by a gear block 59 mounted at the top of control wall 15. Manual operation of the work drive is attained through a suitably placed operating wheel 60 rotatably connected with the drive worm gear 58 through operating shafts 61 and 62 and miter gears 63 supported by wall 14 and control wall 15 with suitable bearing points 64. For determining the axial position of the control rods, an indicia may be provided, as shown in Figure 2, having a suitably graduated scale 66 carried by the control wall in cooperation with an indicator 67 carried by the yoke 49.

In order to provide protection against having foreign objects drawn into gears 21 and 22, which are adapted for high speed operation, a cover guard 70 is fitted exteriorly of the gears and fastened to wall 14. However, if operating conditions warrant it, the unit may be completely enclosed by an extension of the guard to act as a cover with the indicia of weight positions extended and operated from the yoke, as shown by Figure 2, or by means of a suitable indicator geared to shaft 62 with a dial extended above the enclosing cover.

Operation of the vibrator is as follows:

The vibrator unit is suitably secured to any structure to be tested by the application of a vibratory force, a motor drive capable of producing speeds over the desired range is flexibly connected to the drive coupling 24 and energized from a suitable source of power supply. In most cases it will be found desirable to conduct a test over a variable range of frequencies in which the force ranges from zero to the desired maximum, therefore, the yoke 49 should be moved to the extreme inward position which corresponds to a concentric positioning of weights 17 and 18 relative to the drive and driven shafts 19 and 20, respectively. The weights are rotated at the required speeds to attain the frequencies desired and yoke 49 is moved outwardly by manipulation of the hand wheel 60 to withdraw the control rods 25 and 26 which in turn permits centrifugal movement of weights 17 and 18 eccentrically of the shafts. By such manipulation of the controls, the eccentricity of the weights 17 and 18 can be varied to increase or decrease the amount of force developed at any time during operation of the unit over its entire range of frequencies. In the testing of aircraft, it has been found desirable to vibrate specimen units at frequencies of 3,000 cycles per minute, with variable forces of from 0 to 2,600 pounds. The amount of force attained by the vibrator can be definitely determined for any given speed by application of the following well recognized centrifugal force formula $$\frac{W x \omega^2 x r}{g}$$

where $W$ = Weight lbs.
$r$ = Distance from center of rotation to the center of gravity of the mass (in inches).

ω = Angular velocity of the body about the axis in radians =

$$\frac{2\pi N}{60}$$

N = R. P. M.

g = Gravity in inches per sec. per sec. (or per sec.²).

The action of the vibrator with the weights placed in the same axial relationship to each other as shown is to produce vertical vibration such as is customarily used in the conduction of vibratory tests. In those cases where it is found desirable to attain force directed horizontally or along some other predetermined angular direction, the meshed relationship between gears 21 and 22 may be readily changed to provide the angular displacement desired.

As other embodiments and variations may be made of our invention, and changes may be made as hereinbefore described, it is to be understood that all matter described herein or shown in the accompanying drawings is to be interpreted as illustrative only and not in a limiting sense.

We claim as our invention:

1. A force producing mechanism having, in combination, a base, support mounts associated with the base, parallel shafts rotatably supported by said mounts, each of said shafts being formed with an axial cavity extending inwardly from one end to a point adjacent the midsection thereof and an opening in said midsection providing access between said axial cavity and the midsection exterior of each of said shafts, weights slidably mounted on said shafts adjacent said openings, rotatable control rods extending inwardly of the axial cavities formed in said shafts, arms pivoted on the shafts with ends in communication with the control rods and weights adapted to communicate axial movement of the actuators to the weights as radial movement relative to the shafts, a positioning yoke adapted to rotatably receive the ends of the control rods whereby the radial positions of the weights are determined by the positioning of said yoke, a positioning screw associated with the yoke for controlling the position of said yoke so that the centrifugal force developed by said weights in a predetermined direction can be varied on movement of said yoke.

2. A mechanism for producing variable force in an adjacent structure comprising a base having transverse supporting members, a pair of shafts rotatably mounted in said supporting members for variable speed operation, said shafts being provided with a driven connection therebetween, weights carried by said shafts and arranged for radial displacement from positions of concentricity to various positions of eccentricity, control rods associated with the shafts and arranged for axial movement relative to said shafts with one end of each rod spaced adjacent each respective weight, connecting means between the control rods and weights adapted to convert axial movement of the rods to radial movement of the weights and a control rod actuating means connected to the rods for controlled movement thereof to vary the amount of eccentricity of the weights during operation.

3. A mechanism for producing test loads applicable to a structure comprising a base having transverse supporting members, a pair of shafts rotatably mounted in said supporting members for variable speed operation, said shafts being provided with a driven connection therebetween and arranged for angular displacement relative to each other, weights carried by said shafts and arranged for radial displacement from positions of concentricity to various positions of eccentricity, control rods associated with the shafts and arranged for axial movement relative to said shafts with one end of each rod adjacent a weight, connecting means between the control rods and weights adapted to convert axial movement of the rods to radial movement of the weights and a rod actuating means connected to the rods for controlled axial movement thereof to vary the amount of eccentricity of the weights during operation.

4. A mechanism for producing variable force test loads in a structure to be tested comprising a base having transverse supporting members, a pair of shafts rotatably mounted in said supporting members for variable speed operation, said shafts being provided with a driven connection therebetween and arranged for angular displacement relative to each other, weights carried by said shafts and arranged for radial displacement from positions of concentricity to various positions of eccentricity, control rods associated with the shafts and arranged for axial movement relative to said shafts with one end of each rod adjacent each weight, pivoted connecting means between the control rods and weights to convert axial movement of the rods to radial movement in the weights and a rod actuating means connected to the rods for controlled movement thereof to vary the amount of eccentricity of the weights during operation.

5. A vibrating mechanism for producing variable directional force comprising a base having transverse supporting members, two parallel shafts rotatably carried by said supports and arranged for variable speed operation, gears attached to said shafts and arranged for angularly adjustable engagement with each other to rotate said shafts in opposite directions, a pair of weights carried by the shafts and adapted for movement eccentrically and radially of the shafts, control means attached to the weights and having end portions extended beyond the ends of the rotatably mounted shafts for varying the amount of radial displacement of said weights to provide for the development of variable centrifugal force in said weights during rotation of the shafts.

6. A vibrating mechanism for producing variable force having cooperatively rotatable members adjustable as to eccentricity during operation, comprising a rotatably mounted drive shaft, a second shaft parallel to the drive shaft and drivingly connected therewith by meshed gears, said gears being adjustable to change the angular relation of the shafts to each other, each of said shafts being formed with a midsection and a hollow portion extending inwardly from one end and a slot formed in said midsection communicating with the hollow portion, rods carried within the shafts having one end thereof adjacent said slot and the opposite end thereof projecting exteriorly for transmission of axial rod movement, radially movable weights carried by said shafts adjacent said slots, pivoted arms mounted on the shafts operatively connected to the radially moveable weights and said abutment, a yoke connecting the projecting ends of the rods to effect movement thereof, means associated with the yoke for moving said yoke and rods axially of the shafts to effect eccentric adjustment of the weights.

7. In a mechanism for producing variable force test loads, a support a pair of parallel shafts rotatably carried by said support, said shafts being provided with a driven connection therebetween, a pair of weights mounted on said shafts for rotation therewith and limited radial movement with respect thereto, control means extending axially of and within said shafts having pivoted connections with said weights to limit radial movement of the weights.

8. In a mechanism for producing variable force test loads, a support a pair of parallel shafts rotatably carried by said support, said shafts being provided with a driven connection therebetween, a pair of weights mounted on said shafts for rotation therewith and limited radial movement with respect thereto, control means extending axially of said shafts having pivoted connections with said weights to limit radial movement of the weights with respect to said shafts whereby the magnitude and direction of the test load force is determined.

ROBERT S. NEVIN, Sr.
CARLETON M. FIELDS.

REFERENCES CITED

The following references are of record in the file of this patent:

UNITED STATES PATENTS

| Number | Name | Date |
|---|---|---|
| 2,016,006 | Hall et al. | Oct. 1, 1935 |
| 2,065,798 | Dempsey et al. | Dec. 29, 1936 |
| 2,078,715 | Lurz et al. | Apr. 27, 1937 |
| 2,206,386 | Bernhard | July 2, 1940 |
| 2,410,170 | Lazan | Oct. 29, 1946 |